Patented July 3, 1945

2,379,812

UNITED STATES PATENT OFFICE 2,379,812

COATING COMPOSITION

Julius G. Little, Wilmington, Del., assignor to Hercules Powder Company, Wilmington, Del., a corporation of Delaware No Drawing. Application July 30, 1942, Serial No. 452,887

14 Claims. (Cl. 106—144)

This invention relates to coating compositions and, more particularly, to compositions comprising metal protein complexes and resin plasticizers therefor, which are useful as rug backings, adhesives, wall coating, etc.

Heretofore, textile materials such as shade cloths, rug backings and the like have been treated with a variety of compositions to give body, stiffness, and weight. For instance, it has been the practice in the manufacture of woven rugs to coat them on the unnapped or base side with mixtures of starches, gums, softeners, fillers, waxes, etc. These types of finishing mixtures are not entirely satisfactory for finishing fabrics since these mixtures under humidity change are apt to break down, lose their characteristic stiffness and feel, become limp and soft. They are not resistant to dusting out since the starches and gums are imperfect binders for the filling material such as clay.

Other disadvantages in the use of starch-clay mixtures for rub backing, shade cloths and the like, is the ease with which these finishes are removed even in mild washing procedures. This makes it necessary to re-finish the rug each time it is shampooed. Also, finishes containing starch as the binder under warm, humid conditions are likely to promote the growth of mildew.

Now, in accordance with the present invention it has been found that these disadvantages are overcome by the use of a composition of certain protein metal complexes plasticized with a polyhydric alcohol ester of a rosin and containing inert fillers varying from 0 to about 90% depending upon the use to which the composition is to be put. The composition applied to the textiles imparts desirable properties to the textile material with regard to fullness, stiffness or hand, and weight and produces a finish which is substantially resistant to dusting and the mild shampoo and washing treatments ordinarily given to fabrics.

The following examples illustrate methods of carrying out the invention:

Example 1

|  | Parts |
|---|---|
| Zinc caseinate | 19 |
| Ammonium hydroxide 28% | 5 |
| Water | 107 |
| Diethylene glycol ester of rosin —80% solution in xylene | 20 |
| Talc | 70 |
| Pontamine Diazo Black BHSW concentrate | 0.1 |

The above composition was made by wetting the zinc caseinate in 90 parts water for one-half hour and subsequently heating to 110°–120° F. The ammonium hydroxide was then added and the mixture stirred for five minutes. The rosin ester solution was added and stirred in. The talc and dyestuff were stirred with 17 parts of water to form a paste and this was added to the other ingredients, the complete mixture stirred until a smooth paste was formed. The mix was then applied to the back of an Axminster rug and dried in an air blast oven at 200 to 250° F. for 20 to 30 minutes. The rug was given a shampoo treatment with water and a 3% Nacconal NR solution (alkyl aryl sulfonate) at 70° F. and brushed with a soft bristled brush. The rug was thoroughly rinsed with water and then dried at 140° F. The rug sample finished with the above composition showed almost no loss of finish after the shampoo treatment, whereas a rug sample subjected to the same treatment which had been finished with the conventional starch finish lost a major portion of its finish.

Example 2

|  | Parts |
|---|---|
| Zinc caseinate | 8 |
| Clay | 20 |
| Mixture of the diethylene glycol ester of rosin and the pentaerythritol ester of rosin in —80% solution in xylene | 5½ |
| Karaya gum | 0.1 |
| Ammonia 28% | 2 |
| Water at 140° F. | 48 |

The above mixture was made up as described in Example 1 and used to backfill Axminster carpeting which was dried under tension at 230° F. The finish was substantially resistant to the shampoo treatment described in Example 1 above.

Example 3

|  | Parts |
|---|---|
| Zinc caseinate | 27 |
| Mixture of the diethylene glycol ester of rosin and the pentaerythritol ester of rosin —80% solution in xylene | 30 |
| Talc | 120 |
| Ammonia 28% | 12 |
| Water at 140° F. | 130 |

The zinc caseinate was stirred into the water for one-half hour. The ammonia was then added and stirring continued until solution of the zinc caseinate was effected. The other ingredients were stirred in and the mix held at 140° F. for 1½ hours. The mix was then applied to the two sides of a strip of lawn fabric with a doctor blade, and the cloth dried at 220° F. The cloth was well filled and was not affected by sponging with warm soap water. A portion of regularly starched fabric was also tested and it tended to break down on sponging with warm soap water.

The protein metal complexes used are those which are particularly water-insoluble and resistant to decomposition. The metal complexes of casein or vegetable proteins such as soybean protein have been found useful. These metal complexes are made up from the soluble salts of polyvalent metals and particularly zinc, cadmium, aluminum and magnesium. They may be the simple metal proteinates such as, for example, zinc caseinate or they may be the metal proteinate complexes with ammonia or aliphatic amine such as zinc ammonium caseinate.

The resins which are most useful and combine best with the protein metal complexes comprise the polyhydric alcohol esters of a rosin and particularly the glycerine and glycol esters of rosin or hydrogenated rosin, the pentaerythritol esters of rosin or hydrogenated rosin, the glycerine and glycol esters of polymerized rosin or hydrogenated rosin either in solvent solution or emulsion form.

A wide variety of other compounds such as fillers, coloring matter, wetting agents, emulsifying agents, etc. may be used. The fillers commonly used include clay, talc, whiting, etc. Various solvents for the resin such as alcohols, ethers, esters, and hydrocarbons, etc. may also be used.

The percentage composition of the protein resin mixture will vary according to the use to which it is to be put, but in general it will contain from 10 to 60% of the protein complex and from 40 to 90% of the resin. Preferably, a mixture of about 50% resin and 50% complex is used. Where filler is used, the amount may vary very widely as, for instance, from 0% to 90% of the total composition, the above mixture ranging from 10% to 100% of the total composition.

While compositions useful for backing rugs and other textile materials have been described the present invention contemplates the use of the resin metal protein complex composition for any other use such as a paper size, water paint, ink, adhesive, laminating paper, in wallboard coating, etc.

Thus, in accordance with the present invention, a composition comprising a resin plasticizer and a metal protein complex has been described which has desirable properties of resistance to humidity, temperature changes, deterioration, and particularly resistance to water and warm soap solutions.

What I claim and desire to protect by Letters Patent is:

1. A composition comprising a water-insoluble metal protein complex and a polyhydric alcohol rosin ester as a plasticizer therefor.
2. A composition comprising a water-insoluble metal protein complex, a polyhydric alcohol rosin ester as a plasticizer therefor, and a filler.
3. A composition comprising a water-insoluble metal protein complex and from about 40% to about 90% of a polyhydric alcohol rosin ester.
4. A composition comprising a water-insoluble metal casein complex and a polyhydric alcohol rosin ester as a plasticizer therefor.
5. A composition comprising a metal ammonium caseinate and a polyhydric alcohol rosin ester as a plasticizer therefor.
6. A composition comprising zinc caseinate and a polyhydric alcohol rosin ester as a plasticizer therefor.
7. A composition comprising a mixture of:
Polyvalent metal casein complex _____ 10% to 60% by weight
Polyhydric alcohol rosin ester _____ 90% to 40% by weight
Filler 0% to 90% by weight of the total composition 8. A composition comprising a mixture of:
Polyvalent metal casein complex _____ 10% to 60% by weight
Polyhydric alcohol rosin ester _____ 90% to 40% by weight
Clay 0% to 90% by weight of the total composition 9. A composition comprising zinc ammonium casein complex, diethylene glycol ester of rosin, and talc.
10. A composition for backing a rug comprising zinc caseinate, clay, and the diethylene glycol ester of rosin.
11. A composition for backing a rug comprising a water-insoluble metal protein complex, a filler, and the diethylene glycol ester of rosin.
12. A composition for backing a rug comprising zinc ammonium casein complex, a filler, and a polyhydric alcohol rosin ester.
13. A composition for backing a rug comprising zinc caseinate and a mixture of diethylene glycol ester of rosin and the pentaerythritol ester of rosin.
14. A composition for backing a rug comprising zinc ammonium casein complex, a mixture of diethylene ester of rosin and the pentaerythritol ester of rosin, and clay.

JULIUS G. LITTLE.

---

CERTIFICATE OF CORRECTION.

Patent No. 2,379,812. July 3, 1945.

JULIUS G. LITTLE.

It is hereby certified that error appears in the printed specification of the above numbered patent requiring correction as follows: Page 2, second column, line 10, claim 4, after "water-insoluble" insert --polyvalent--; and that the said Letters Patent should be read with this correction therein that the same may conform to the record of the case in the Patent Office.

Signed and sealed this 2nd day of October, A. D. 1945.

Leslie Frazer (Seal)    First Assistant Commissioner of Patents.

blade, and the cloth dried at 220° F. The cloth was well filled and was not affected by sponging with warm soap water. A portion of regularly starched fabric was also tested and it tended to break down on sponging with warm soap water.

The protein metal complexes used are those which are particularly water-insoluble and resistant to decomposition. The metal complexes of casein or vegetable proteins such as soybean protein have been found useful. These metal complexes are made up from the soluble salts of polyvalent metals and particularly zinc, cadmium, aluminum and magnesium. They may be the simple metal proteinates such as, for example, zinc caseinate or they may be the metal proteinate complexes with ammonia or aliphatic amine such as zinc ammonium caseinate.

The resins which are most useful and combine best with the protein metal complexes comprise the polyhydric alcohol esters of a rosin and particularly the glycerine and glycol esters of rosin or hydrogenated rosin, the pentaerythritol esters of rosin or hydrogenated rosin, the glycerine and glycol esters of polymerized rosin or hydrogenated rosin either in solvent solution or emulsion form.

A wide variety of other compounds such as fillers, coloring matter, wetting agents, emulsifying agents, etc. may be used. The fillers commonly used include clay, talc, whiting, etc. Various solvents for the resin such as alcohols, ethers, esters, and hydrocarbons, etc. may also be used.

The percentage composition of the protein resin mixture will vary according to the use to which it is to be put, but in general it will contain from 10 to 60% of the protein complex and from 40 to 90% of the resin. Preferably, a mixture of about 50% resin and 50% complex is used. Where filler is used, the amount may vary very widely as, for instance, from 0% to 90% of the total composition, the above mixture ranging from 10% to 100% of the total composition.

While compositions useful for backing rugs and other textile materials have been described the present invention contemplates the use of the resin metal protein complex composition for any other use such as a paper size, water paint, ink, adhesive, laminating paper, in wallboard coating, etc.

Thus, in accordance with the present invention, a composition comprising a resin plasticizer and a metal protein complex has been described which has desirable properties of resistance to humidity, temperature changes, deterioration, and particularly resistance to water and warm soap solutions.

What I claim and desire to protect by Letters Patent is:

1. A composition comprising a water-insoluble metal protein complex and a polyhydric alcohol rosin ester as a plasticizer therefor.
2. A composition comprising a water-insoluble metal protein complex, a polyhydric alcohol rosin ester as a plasticizer therefor, and a filler.
3. A composition comprising a water-insoluble metal protein complex and from about 40% to about 90% of a polyhydric alcohol rosin ester.
4. A composition comprising a water-insoluble metal casein complex and a polyhydric alcohol rosin ester as a plasticizer therefor.
5. A composition comprising a metal ammonium caseinate and a polyhydric alcohol rosin ester as a plasticizer therefor.
6. A composition comprising zinc caseinate and a polyhydric alcohol rosin ester as a plasticizer therefor.
7. A composition comprising a mixture of:
   Polyvalent metal casein complex _____ 10% to 60% by weight
   Polyhydric alcohol rosin ester _____ 90% to 40% by weight
   Filler 0% to 90% by weight of the total composition 8. A composition comprising a mixture of:
   Polyvalent metal casein complex _____ 10% to 60% by weight
   Polyhydric alcohol rosin ester _____ 90% to 40% by weight
   Clay 0% to 90% by weight of the total composition 9. A composition comprising zinc ammonium casein complex, diethylene glycol ester of rosin, and talc.
10. A composition for backing a rug comprising zinc caseinate, clay, and the diethylene glycol ester of rosin.
11. A composition for backing a rug comprising a water-insoluble metal protein complex, a filler, and the diethylene glycol ester of rosin.
12. A composition for backing a rug comprising zinc ammonium casein complex, a filler, and a polyhydric alcohol rosin ester.
13. A composition for backing a rug comprising zinc caseinate and a mixture of diethylene glycol ester of rosin and the pentaerythritol ester of rosin.
14. A composition for backing a rug comprising zinc ammonium casein complex, a mixture of diethylene ester of rosin and the pentaerythritol ester of rosin, and clay.

JULIUS G. LITTLE.

CERTIFICATE OF CORRECTION.

Patent No. 2,379,812. July 3, 1945.

JULIUS G. LITTLE.

It is hereby certified that error appears in the printed specification of the above numbered patent requiring correction as follows: Page 2, second column, line 10, claim 4, after "water-insoluble" insert --polyvalent--; and that the said Letters Patent should be read with this correction therein that the same may conform to the record of the case in the Patent Office.

Signed and sealed this 2nd day of October, A. D. 1945.

Leslie Frazer (Seal) First Assistant Commissioner of Patents.